United States Patent [19]

Amann

[11] Patent Number: 4,484,517

[45] Date of Patent: Nov. 27, 1984

[54] UNIT FOR THE STORAGE AND AGING OF MEAT AND SAUSAGES

[75] Inventor: Emmo Amann, Hohenems, Austria

[73] Assignee: Gottfried Amann & Sohn Gesellschaft mbH & Co., Hohenems, Austria

[21] Appl. No.: 354,625

[22] Filed: Mar. 4, 1982

[30] Foreign Application Priority Data

Mar. 16, 1981 [AT] Austria ................................. 1191/81

[51] Int. Cl.³ .............................................. A23B 4/00
[52] U.S. Cl. ...................................... 99/474; 98/33 A;
99/470; 99/483; 422/121; 426/418
[58] Field of Search .......... 99/467, 468, 469, 473–476,
99/477–479, 483, 486, 487, 493, 516; 219/401,
362; 34/151; 126/369, 20, 348, 369.1; 98/54, 55,
33 A, 32; 426/418, 419, 124; 422/120, 121;
55/102, 126, 131, 136, 271, 279

[56] References Cited

U.S. PATENT DOCUMENTS

| 2,767,639 | 10/1956 | Johnson et al. | 98/33 A |
| 3,422,600 | 1/1969 | Chamberlain | 422/121 X |
| 3,958,028 | 5/1976 | Burg | 426/418 |
| 4,362,090 | 12/1982 | Whiteley | 99/33 A |

FOREIGN PATENT DOCUMENTS 1959439 11/1969 Fed. Rep. of Germany ...... 426/418

Primary Examiner—Timothy F. Simone
Attorney, Agent, or Firm—Toren, McGeady and Stanger

[57] ABSTRACT

A storage and aging unit for meat and sausages includes a closed space for the meat and sausages and an air conditioning unit for circulating air in a closed cycle through the closed space. Inlet and outlet openings from the air conditioning unit are in direct communication with the closed space. A sterilizing unit is located within the air conditioning unit in the path of flow of the air between the inlet and outlet openings.

4 Claims, 3 Drawing Figures

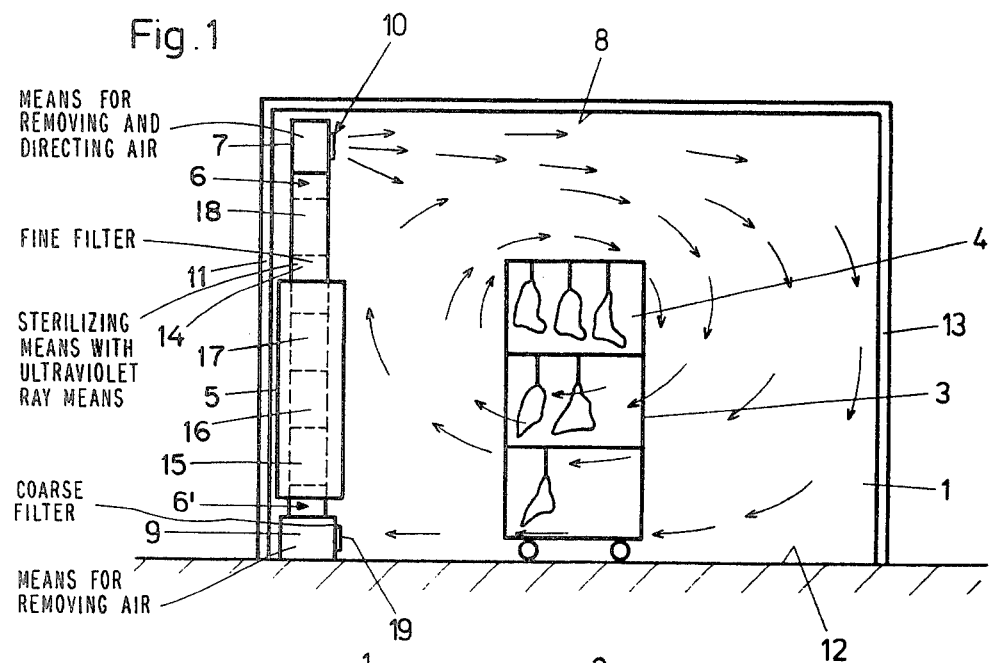
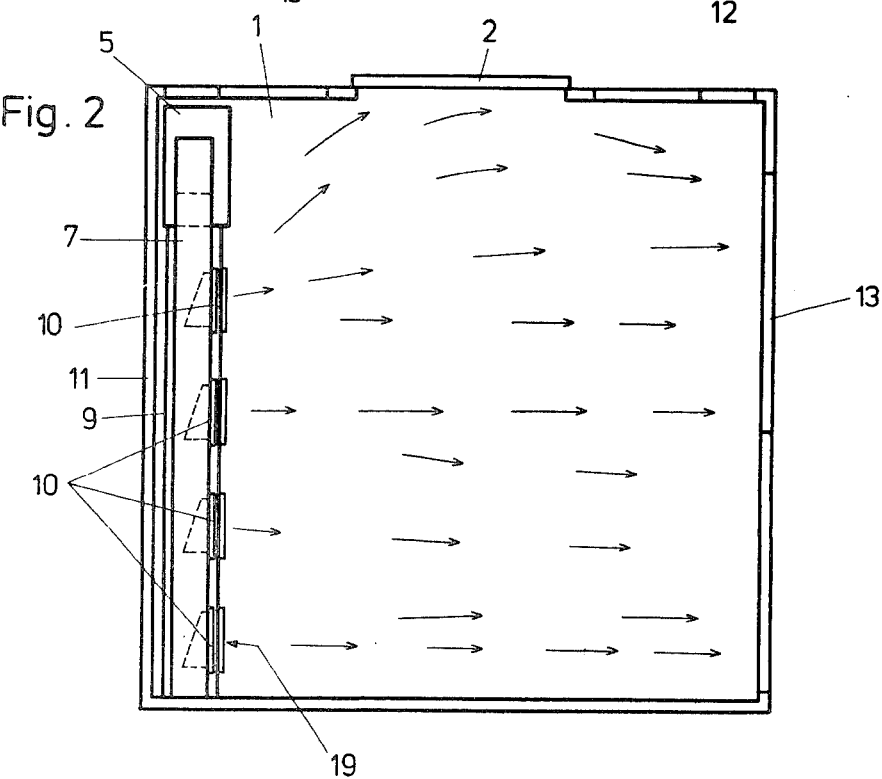

UNIT FOR THE STORAGE AND AGING OF MEAT AND SAUSAGES

SUMMARY OF THE INVENTION

The present invention is directed to a storage and aging unit for meat and sausages with an air conditioning unit for circulating air in a closed cycle through the space. The air circulated through the storage and aging space is conducted through air ducts each with one or several inlet and outlet openings connected directly to the closed space. The air circulating through the ducts is sterilized.

The following are representative of the state of the art: West German Pat. No. 598 608, "Handbook of Food Chemistry" Vol. 1, page 1082, J. Schormüller, Berlin-Heidelberg-New York 1965; "Textbook of Food Chemistry", page 270, last paragraph, J. SchormUML/u/ ller, Berlin-Göttingen-Heidelberg, 1961.

There is a known storage space in which a stream of cooling air is passed over sausages. In the ceiling of the storage space as well as in the region of the floor, several inlets and outlets are provided which circulate air through the space and over the product with the air flowing in the vertical direction. As a consequence, not all of the surfaces of the sausages and meat are contacted by the flow of air and, further, there is the disadvantage that the incoming air flows directly onto the products to be dried or cooled. In this known embodiment, an additional ozone installation is provided in the storage space so that with a continuous feed of ozone the air within the space is sterilized. Such an arrangement results in additional flows of air which interfere with satisfactory storage and aging of the meat and sausages. Furthermore, not all of the volume within the storage space is covered with such a separate ozone installation, because then a correspondingly strong additional stream would have to be directed passed the ozone installation. A disadvantage of such an arrangement is that it is not possible to sterilize all of the air uniformly so that, in spite of the presence of the ozone installation, mold growth cannot be prevented and, after such mold forms, it grows relatively quickly.

It is also known to use ultraviolet radiation for sterilizing a space used for storage purposes. It is possible to set up a conventional sterilizing installation with such an ultraviolet radiation unit freestanding in a storage space, however, an additional stream of air is developed which interferes with a satisfactory flow within the storage space. Tests have indicated that in particular the flow conditions in such a storage space are important in achieving an optimum drying or aging of the product. If air streams from an additional unit are present, then problems result. Moreover, it is almost impossible to sterilize the flow through a storage space using one separate sterilizing unit.

Therefore, it is the primary object of the present invention to provide a storage and aging unit in which practically germ-free air is circulated through the storage space without the disadvantage of interfering streams of air circulating in the storage space.

In accordance with the present invention, a closed cycle of air is provided for circulation through the storage space with a sterilizing unit positioned in the path of the air as it flows from an outlet opening from the storage space to an inlet opening into the space. Therefore, in the closed flow path between the outlet and inlet openings, the air circulating in a closed cycle through the storage space is not only cooled or heated or humidified, it is also disinfected or sterilized. Tests run on such an arrangement have shown that the formation of mold within the storage space is avoided, because the entire flow of air is passed through the sterilizing unit and, as a result, uniformly sterilized air circulates through all of the volume within the storage space. When the unit embodying the present invention is used, any mold already on the products placed in the storage space disappears.

The advantages afforded by the present invention can be obtained only when the sterilizing installation is combined directly with the air conditioning unit with the entire volume of air circulated through the storage space being sterilized. The air flow in the storage space can be exactly regulated and is free of any interfering influences, since additional flowing streams of air are excluded.

This arrangement embodying the present invention affords significantly improved control, because the air conditioning unit, the humidifying unit and the sterilizing unit can be coordinated in an optimum manner and exchanged relative to one another, if necessary.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is a schematic view, in vertical section, of a storage and aging space incorporating the present invention;

FIG. 2 showing, in plan, of the space shown in FIG. 1 the ceiling removed; and

DETAILED DESCRIPTION OF THE INVENTION

Figure 3:
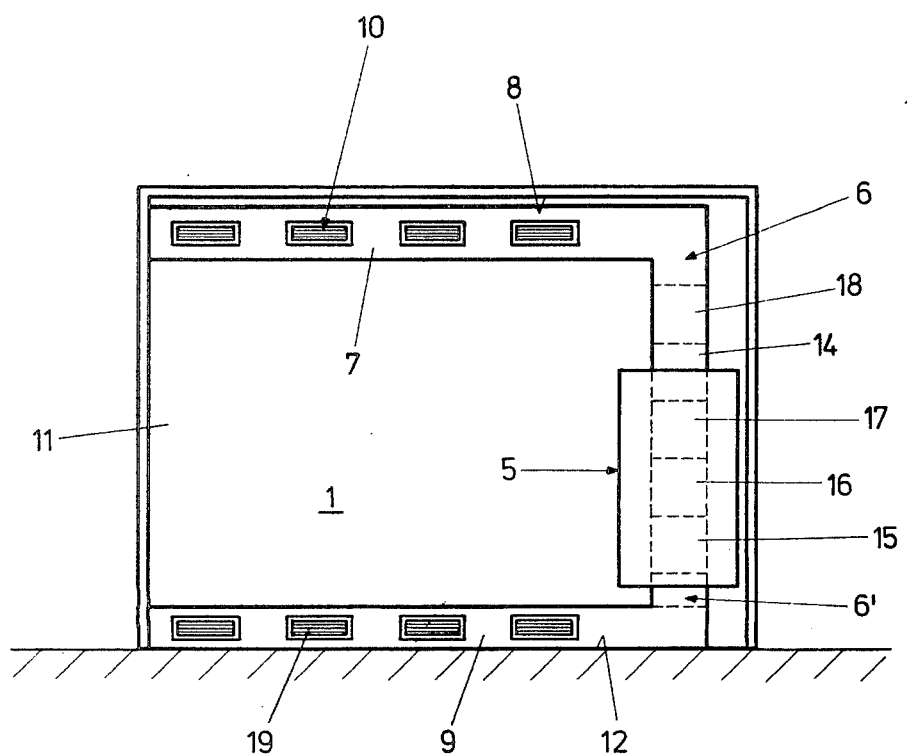
FIG. 3 is an interior view of the storage space shown in FIGS. 1 and 2 viewed in the direction toward the air ducts for the storage space.

In the drawing the storage and aging space illustrated is intended only as an exemplary embodiment, since the design of the space, the arrangement of the air ducts, and the arrangement of the inlet and outlet openings to and from the space can be varied. In the embodiment shown, the air conditioning unit and the air ducts are installed within the storage space. It would be possible, however, to provide only the air inlet and outlet openings within the storage space and to locate the cooperating units outside of the space.

Storage and aging space 1 is a completely enclosed space which can be constructed within a larger space. Alternatively, the space 1 can be a room forming the boundaries of the space. Access to the space 1 is available through a door 2, note FIG. 2, through which pieces of meat 4, hung on a movable carriage 3, can be transported into the space through the door. Positioned along one wall 11 of the space 1 is an air conditioning unit 5 including a vaporizer 15, a ventilator 16, a heating unit 17, and a humidifying unit 18. An air outlet line 6 from the unit 5 opens into air duct 7, located adjacent the ceiling 8 and extending approximately horizontally.

At the lower end of the air conditioning unit 5 there is an air inlet line 6' connected to an air inlet duct 9 extending horizontally along the floor 12 of the space 1. As can be seen in FIG. 3, the air outlet duct 7 and the air inlet duct 9 each extend horizontally across one wall 11 of the storage space 1. The air outlet duct 7 has outlet openings 10 adjacent the ceiling 8 while the air inlet duct 9 has inlet openings 19 adjacent the floor 12.

Air duct 7 extends across the top of wall 11, forming one of the side walls of the space 1, adjacent to the ceiling 8. Air inlet duct 9 arranged to receive the exhaust air from the storage space 1 extends along the base of the wall 11 at the floor 12. In this illustrated embodiment, as shown by the arrows in FIG. 2, air flows out of the outlet openings 10 to the opposite wall 13 of the storage space and then is deflected downwardly flowing across the floor 12 back to the air inlet openings 19 into the air inlet duct 9 and then through the inlet line 6' into the air conditioning unit 5.

As the air passes through the air conditioning unit 5 from the inlet openings 19 to the outlet openings 10 it flows through a sterilizing unit 14 located next to the downstream end of the air conditioning unit. Sterilizing unit 14 consists of a coarse filter, a sterilizing stage using ultraviolet rays and a fine filter. It is advantageous if these components are installed so that they adjoin one another successively to afford a favorable exchangeability. Accordingly, it would be advantageous to place the sterilizing unit 14 in the flow direction following the air conditioning unit 5. In the illustrated example, the sterilizing unit 14 is located between the heater 17 of the air conditioning unit and the humidifying unit 18.

Within the scope of the invention, it is also possible to place a coarse filter at the inlet openings 19 and to locate the sterilizing stage and an appropriate fine filter following the air conditioning unit 5. Furthermore, it would also be possible to position the sterilizing unit 14 directly ahead of the outlet openings 10. In this description of the invention it has been indicated that the sterilizing unit 14 or its various components can be located at different positions in the closed cycle of flow through the air conditioning unit. It is essential and important that the sterilizing unit is combined with the air conditioning unit as the air flows between the inlet openings 19 and the outlet openings 10. It is only in this way that optimum flow conditions can be maintained in the storage space affording an appropriate coordination of the air conditioning unit, the sterilizing unit and the humidifying unit.

While specific embodiments of the invention have been shown and described in detail to illustrate the application of the inventive principles, it will be understood that the invention may be embodied otherwise without departing from such principles.

I claim:

1. A storage and aging unit such as for meat and sausages including means forming an enclosed storage space, an enclosed air conditioning unit separate from and in flow communication with said storage space for circulating air in a closed cycle through said enclosed storage space, means for removing air from the storage space and directing the air to said air conditioning unit, means for receiving air from said air conditioning unit and directing the air back into said storage space, and means for sterilizing the air circulated within said storage space, wherein the improvement comprises that said sterilizing means includes a sterilizing unit located in the path of flow of the air circulating through said storage space as it passes between said means for removing air from the storage space and said means for receiving air from said air conditioning unit and directing air into said storage space, said means for removing air and said means for receiving air arranged in spaced relation so that the air flows in a closed cycle through said enclosed storage space and air conditioning unit, and said sterilizing unit comprises a coarse filter, a sterilizing stage using ultraviolet rays, and a fine filter, said air conditioning unit includes a heating unit and a humidifying unit located between said heating unit and said means for directing air into said storage space, said sterilizing stage located between said heating unit and said humidifying unit.

2. A storage and aging unit such as for meat and sausages including means forming an enclosed storage space, an enclosed air conditioning unit separate from and in flow communication with said storage space for circulating air in a closed cycle through said closed storage space, means for removing air from the storage space and directing the air to said storage unit, means for receiving air from said air conditioning unit and directing the air back into said storage space, and means for sterilizing the air circulated within said storage space, wherein the improvement comprises that said sterilizing means includes a sterilizing unit located in the path of flow of the air circulating through said storage space as it passes between said means for removing air from the storage space and said means for receiving air from said air conditioning unit and directing air into said storage space, said means for removing air and said means for receiving air arranged in spaced relation so that the air flows in a closed cycle through said enclosed space and air conditioning unit, and said sterilizing unit comprises a coarse filter, a sterilizing stage using ultraviolet rays, and a fine filter, said sterilizing unit is located downstream from said air conditioning unit in the direction of flow of air through said air conditioning unit before the air passes through said means for receiving air from said air conditioning unit.

3. A storage and aging unit such as for meat and sausages including means forming an enclosed storage space, an enclosed air conditioning unit separate from and in flow communication with said storage space for circulating air in a closed cycle through said enclosed storage space, means for removing air from the storage space and directing the air to said air conditioning unit, means for receiving air from said air conditioning unit and directing the air back into said storage space, and means for sterilizing the air circulated within said storage space, wherein the improvement comprises that said sterilizing means includes a sterilizing unit located in the path of flow of the air circulating through said storage space as it passes between said means for removing air from the storage space and said means for receiving air from said air conditioning unit and directing air into said storage space, said means for removing air and said means for receiving air arranged in spaced relation so that the air flows in a closed cycle through said enclosed space and said air conditioning unit, and said sterilizing unit comprises a coarse filter, a sterilizing stage using ultraviolet rays, and a fine filter, said coarse filter is located next to said emans for removing air from said storage space, and said sterilizing stage and said fine filter are located downstream of said air conditioning unit in the direction of the flow of air therethrough.

4. A storage and aging unit, as set forth in claims 1, 2 or 3 wherein said air conditioning unit includes a heating unit, a humidifying unit located between said air conditioning unit and said means for directing air into said storage space, and said sterilizing unit located between said heating unit and said humidifying unit.

* * * * *